United States Patent
Lim et al.

(10) Patent No.: US 9,165,708 B2
(45) Date of Patent: Oct. 20, 2015

(54) THIN FILM COIL AND ELECTRONIC DEVICE HAVING THE SAME

(75) Inventors: Dae Ki Lim, Gyunggi-do (KR); Tae Sung Kim, Gyunggi-do (KR); Hyeon Gil Nam, Gyunggi-do (KR); Chan Gwang An, Gyunggi-do (KR); Hyun Seok Lee, Gyunggi-do (KR); Ki Won Chang, Gyunggi-do (KR); Chang Mok Han, Gyunggi-do (KR); Sang Woo Bae, Gyunggi-do (KR); Sung Eun Cho, Gyunggi-do (KR); Jae Suk Sung, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 447 days.

(21) Appl. No.: 13/533,560

(22) Filed: Jun. 26, 2012

(65) Prior Publication Data
US 2013/0257362 A1    Oct. 3, 2013

(30) Foreign Application Priority Data
Mar. 29, 2012    (KR) .................. 10-2012-0032341

(51) Int. Cl.
| | |
|---|---|
| H01F 17/00 | (2006.01) |
| H01F 38/14 | (2006.01) |
| H01F 27/28 | (2006.01) |
| H01F 27/29 | (2006.01) |
| H02J 7/02 | (2006.01) |

(52) U.S. Cl.
CPC ............ *H01F 38/14* (2013.01); *H01F 27/2804* (2013.01); *H01F 17/00* (2013.01); *H01F 17/0006* (2013.01); *H01F 27/29* (2013.01); *H01F 2017/004* (2013.01); *H01F 2017/0053* (2013.01); *H01F 2017/0073* (2013.01); *H01F 2017/0086* (2013.01); *H02J 7/025* (2013.01)

(58) Field of Classification Search
CPC ............ H01F 5/00; H01F 5/04; H01F 10/00; H01F 17/00; H01F 17/0006; H01F 2017/004; H01F 2017/0053; H01F 17/0073; H01F 2017/0086; H02J 7/025
USPC ............ 320/107–108; 336/200, 90, 186, 232
See application file for complete search history.

(56) References Cited

U.S. PATENT DOCUMENTS

| | | | | |
|---|---|---|---|---|
| 3,247,476 | A | * | 4/1966 | Pintell ........................... 336/177 |
| 3,522,494 | A | * | 8/1970 | Bosch ........................... 257/427 |

(Continued)

FOREIGN PATENT DOCUMENTS

| | | | | |
|---|---|---|---|---|
| JP | 01310518 | A | * | 12/1989 |
| JP | 05081615 | A | * | 4/1993 |

(Continued)

OTHER PUBLICATIONS

Japanese Office Action issued in Application No. 2012-123508 dated Sep. 10, 2013.

(Continued)

*Primary Examiner* — Stacy Whitmore
(74) *Attorney, Agent, or Firm* — NSIP Law (57) ABSTRACT

A thin film coil and an electronic device having the same. The thin film coil includes a substrate; and a coil pattern including a first coil strand and a second coil strand formed respectively on opposite surfaces of the substrate, wherein the first coil strand formed on one surface of the substrate includes at least one path that passes through the other surface of the substrate.

20 Claims, 6 Drawing Sheets

(56) References Cited

U.S. PATENT DOCUMENTS

| | | | |
|---|---|---|---|
| 5,701,067 A * | 12/1997 | Kaji et al. | 320/101 |
| 6,517,193 B2 * | 2/2003 | Kimura | 347/54 |
| 8,228,027 B2 * | 7/2012 | Gao | 320/108 |
| 8,330,416 B2 * | 12/2012 | Goma | 320/112 |
| 8,729,855 B2 * | 5/2014 | Kobayashi et al. | 320/108 |
| 8,786,250 B2 * | 7/2014 | Furuya et al. | 320/107 |
| 8,798,538 B2 * | 8/2014 | Han et al. | 455/41.1 |
| 2002/0071003 A1 * | 6/2002 | Kimura | 347/54 |
| 2004/0017179 A1 * | 1/2004 | Wu | 320/115 |
| 2004/0227608 A1 * | 11/2004 | Nakatani et al. | 336/173 |
| 2007/0182367 A1 * | 8/2007 | Partovi | 320/108 |
| 2007/0247268 A1 * | 10/2007 | Oya et al. | 336/200 |
| 2007/0296536 A1 * | 12/2007 | Odahara et al. | 336/200 |
| 2008/0061735 A1 * | 3/2008 | Toya et al. | 320/108 |
| 2008/0164840 A1 * | 7/2008 | Kato et al. | 320/108 |
| 2008/0164844 A1 * | 7/2008 | Kato et al. | 320/114 |
| 2008/0197963 A1 * | 8/2008 | Muto | 336/200 |
| 2008/0278112 A1 * | 11/2008 | Hui et al. | 320/108 |
| 2008/0309287 A1 * | 12/2008 | Reed | 320/108 |
| 2009/0121819 A1 * | 5/2009 | Haratani et al. | 336/221 |
| 2009/0140691 A1 * | 6/2009 | Jung | 320/108 |
| 2009/0153229 A1 * | 6/2009 | Hanke et al. | 327/530 |
| 2010/0117737 A1 * | 5/2010 | Kondo et al. | 330/276 |
| 2010/0248623 A1 * | 9/2010 | Haratani et al. | 455/41.1 |
| 2010/0253153 A1 * | 10/2010 | Kondo et al. | 307/104 |
| 2010/0265159 A1 * | 10/2010 | Ando et al. | 343/913 |
| 2010/0289450 A1 * | 11/2010 | Kook | 320/108 |
| 2011/0018490 A1 * | 1/2011 | Furuya et al. | 320/101 |
| 2011/0109265 A1 * | 5/2011 | Hui | 320/108 |
| 2011/0221385 A1 * | 9/2011 | Partovi et al. | 320/101 |
| 2011/0248782 A1 * | 10/2011 | Kondo et al. | 330/269 |
| 2012/0049991 A1 * | 3/2012 | Baarman et al. | 336/199 |
| 2012/0176197 A1 * | 7/2012 | Kondo et al. | 330/276 |
| 2012/0187903 A1 * | 7/2012 | Tabata et al. | 320/108 |
| 2012/0235636 A1 * | 9/2012 | Partovi | 320/108 |
| 2012/0256585 A1 * | 10/2012 | Partovi et al. | 320/108 |
| 2012/0274148 A1 * | 11/2012 | Sung et al. | 307/104 |
| 2012/0319647 A1 * | 12/2012 | Itabashi et al. | 320/108 |
| 2013/0119927 A1 * | 5/2013 | Partovi | 320/108 |
| 2013/0181876 A1 * | 7/2013 | Miura et al. | 343/788 |
| 2013/0285604 A1 * | 10/2013 | Partovi | 320/108 |
| 2013/0285605 A1 * | 10/2013 | Partovi | 320/108 |
| 2013/0300355 A1 * | 11/2013 | Jung | 320/108 |
| 2014/0103873 A1 * | 4/2014 | Partovi et al. | 320/108 |
| 2014/0184151 A1 * | 7/2014 | Han et al. | 320/108 |
| 2014/0217966 A1 * | 8/2014 | Schneider et al. | 320/108 |
| 2014/0224267 A1 * | 8/2014 | Levitz et al. | 131/329 |
| 2014/0239892 A1 * | 8/2014 | Sawa et al. | 320/108 |

FOREIGN PATENT DOCUMENTS

| | | | |
|---|---|---|---|
| JP | 10255629 A | * | 9/1998 |
| JP | 2007-157955 A | | 6/2007 |
| JP | 2007157985 A | | 6/2007 |
| JP | 2008-172872 | | 7/2008 |
| JP | 2008-205215 | | 9/2008 |
| JP | 4367487 B2 | | 11/2009 |
| JP | 2013008859 A | | 1/2013 |
| KR | 200357251 | | 7/2004 |
| KR | 10-2010-0092741 A | | 8/2010 |
| WO | 2006008878 A1 | | 1/2006 |

OTHER PUBLICATIONS

Korean Office Action for Application No. 10-2012-0032341 dated Apr. 26, 2013.

English translation of WO 2006/008878 (referencef No. 2 in the previously submitted Information Disclosure Statement filed on Dec. 3, 2012.

Chinese Office Action issued May 20, 2015 for corresponding Chinese Patent Application No. 20121018950.2.

Korean Office Action issued May 28, 2015 for the corresponding Korean Patent Application No. 10-2015-0054774 (English translation pp. 1-6; Korean Office Action pp. 7-13).

Korean Office Action issued May 29, 2015 for the corresponding Korean Patent Application No. 10-2015-0054773 (English translation pp. 1-6; Korean Office Action pp. 7-13).

* cited by examiner

THIN FILM COIL AND ELECTRONIC DEVICE HAVING THE SAME

CROSS-REFERENCE TO RELATED APPLICATIONS

This application claims the priority of Korean Patent Application No. 10-2012-0032341 filed on Mar. 29, 2012, in the Korean Intellectual Property Office, the disclosure of which is incorporated herein by reference.

BACKGROUND OF THE INVENTION

1. Field of the Invention

The present invention relates to a thin film coil and an electronic device having the same, and more particularly, to a contactless power transfer apparatus capable of wirelessly transmitting power by using electromagnetic induction and a thin film coil used therefor.

2. Description of the Related Art

Recently, in order to charge a rechargeable battery installed in a mobile terminal or the like, a system for wirelessly transmitting power, namely, in a contactless manner, has been under research.

In general, a contactless power transfer apparatus includes a contactless power transmission apparatus transmitting power and a contactless power reception apparatus receiving and storing power.

Such a contactless power transfer apparatus transmits and receives power by using electromagnetic induction, and to this end, each contactless power transfer apparatus includes a coil therein.

A related art contactless power transfer apparatus is configured to have a coil wound parallel to a bottom surface thereof (i.e., an external contact surface). Also, a coil may be configured to be fixed to a bottom surface by an adhesive, a bonding sheet, or the like.

However, in the related art, a general wire-type coil is employed. Thus, coils are wound in an overlapping, stacked manner. This may cause a defect in which the thickness of a contactless power transfer apparatus is increased due to the thickness of the coil and the number of windings of coils.

Thus, in order to keep up with the recent trend in which relatively thinner devices are preferred, a development of a thinner contactless power transfer apparatus is required.

Also, the related art largely uses a single line type coil, so an AC resistance value may be increased due to an eddy current, a skin effect, or the like, at a low frequency, to thereby cause loss.

RELATED ART DOCUMENT

Japanese Patent Laid Open Publication No. 2008-172872

SUMMARY OF THE INVENTION

An aspect of the present invention provides a thin film coil formed to be relatively thinner and an electronic device having the same.

Another aspect of the present invention provides a contactless power transfer apparatus having a significantly reduced thickness by using a thin film coil.

Another aspect of the present invention provides a contactless power transfer apparatus capable of significantly reducing loss caused by an eddy current, a skin effect, or the like, at a low frequency.

According to an aspect of the present invention, there is provided a thin film coil including: a substrate; and a coil pattern including a first coil strand and a second coil strand formed on both surfaces of the substrate, respectively, wherein the first coil strand formed on one surface of the substrate includes at least one path passing through the other surface of the substrate and electrically connecting between two sections of the first coil strand located on the one surface (such path structure is hereafter referred to for convenience as a "detour path").

The detour path may share a portion of the second coil strand formed on the other surface of the substrate.

The detour path may be formed as the first coil strand is connected to the second coil strand through a via (such structure hereafter referred to for convenience as a "detour via").

The at least one detour path may include: two detour vias electrically connecting the first coil strand and the second coil strand; and a shared section disposed between the two detour vias of the second coil strand.

The thin film coil may further include: two contact pads disposed outwardly of the coil pattern and electrically connected to both ends of the coil pattern.

One end of the first coil strand may be electrically connected to the contact pad through a portion of one surface of the substrate corresponding to the detour path.

The first coil strand and the second coil strand may be connected in parallel.

The second coil strand may include a conductive connection via formed to be disposed at each of both ends thereof and may be electrically connected to the first coil strand by the conductive connection via.

The first coil strand and the second coil strand may be disposed on portions of both surfaces of the substrate to which they correspond in a vertical direction.

According to another aspect of the present invention, there is provided a thin film coil including: a substrate; a coil pattern including a first coil strand and a second coil strand formed on both surfaces of the substrate, respectively; and two contact pads disposed outwardly of the coil pattern and electrically connected to both ends thereof, wherein the first coil strand formed on one surface of the substrate includes: a spiral pattern; and a lead out pattern disposed to traverse the spiral pattern from one end disposed at an inner side of the spiral pattern so as to be electrically connected to the contact pad.

A portion of the spiral pattern of the first coil strand in which the lead out pattern is disposed may pass through the other surface of the substrate and the spiral pattern may detour based on the lead out pattern.

The detour path portion of the first coil may share a portion of the second coil strand formed on the other surface of the substrate.

According to another aspect of the present invention, there is provided an electronic device including: a contactless power transmission apparatus having a thin film coil including a first coil strand and a second coil strand formed on both surfaces of a substrate and connected in parallel, respectively, the first coil strand formed on one surface of the substrate including at least one detour path that passes through the other surface of the substrate; and a case accommodating the contactless power transmission apparatus therein.

The contactless power transmission apparatus may be directly attached to an inner surface of the case or disposed to be closer to the inner surface of the case.

The electronic device may further include: a battery storing power generated from the contactless power transmission apparatus.

The electronic device may further include: a voltage conversion unit converting alternating current (AC) power supplied from the outside into an AC voltage having a particular frequency and providing the converted AC voltage to the contactless power transmission apparatus.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the appropriate method he or she knows for carrying out the invention. Therefore, the configurations described in the embodiments and drawings of the present invention are merely appropriate embodiments but do not represent all of the technical spirit of the present invention. Thus, the present invention should be construed as including all the changes, equivalents, and substitutions included in the spirit and scope of the present invention at the time of filing this application.

Hereinafter, embodiments of the present invention will be described in detail with reference to the accompanying drawings. At this time, it is to be noted that like reference numerals denote like elements in appreciating the drawings. Moreover, detailed descriptions related to well-known functions or configurations will be ruled out in order not to unnecessarily obscure the subject matter of the present invention. Based on the same reason, it is to be noted that some components shown in the drawings are exaggerated, omitted or schematically illustrated, and the size of each component does not exactly reflect its actual size.

Hereinafter, embodiments of the present invention will be described in detail with reference to the accompanying drawings. In describing embodiments of the invention, a contactless power transfer apparatus comprehensively refers to a contactless power transmission apparatus transmitting power and a contactless power reception apparatus receiving and storing power.

Figure 1:
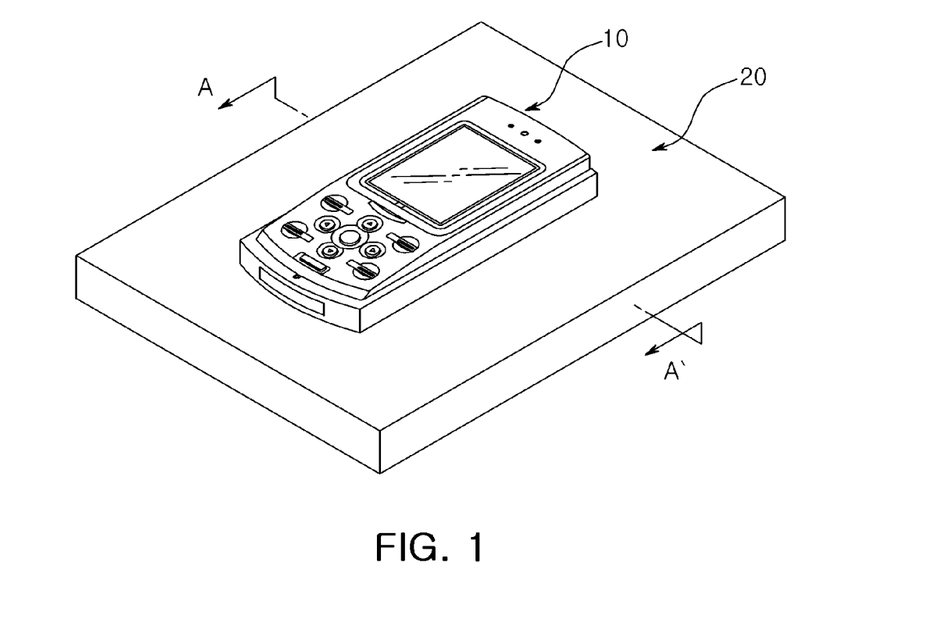
FIG. 1 is a perspective view schematically illustrating an electronic device according to an embodiment of the present invention.
Figure 2:
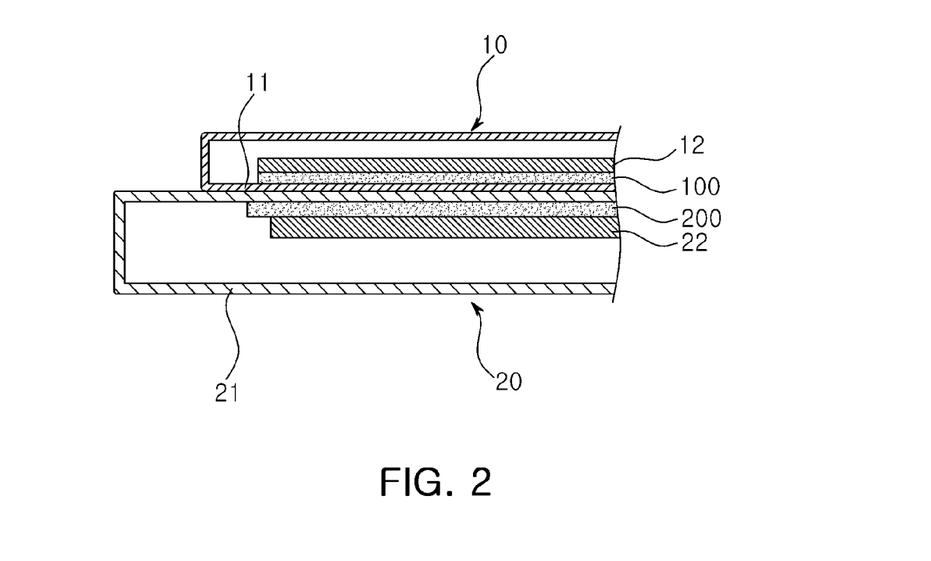
FIG. 2 is a cross-sectional view taken along line A-A' in FIG. 1.

FIG. 1 is a perspective view schematically illustrating an electronic device according to an embodiment of the present invention, and FIG. 2 is a cross-sectional view taken along line A-A' in FIG. 1.

With reference to FIGS. 1 and 2, an electronic device according to the present embodiment may be a portable device 10 or a charging device 20, or may be a contactless power reception apparatus 100, or a contactless power transmission apparatus 200 provided in the portable device 10 or the charging device 20.

The portable device 10 may include a battery 12 and a contactless power reception apparatus 100 providing power to the battery 12 to charge the battery 12.

The battery 12 may be a rechargeable battery (or a secondary battery) and may be detachably attached to the portable device 10.

The contactless power reception apparatus 100 may be accommodated within a case 11 of the portable device 10 and directly attached to an inner surface of the case 11 or disposed to be as close as possible to the inner surface of the case 11.

Also, the charging device 20 according to the present embodiment is provided to charge the battery 12 of the portable device 10. To this end, the charging device 20 may include the contactless power transmission device 200 within the case 21.

The charging device 20 may convert household AC power provided from the outside into DC power, convert the DC power into an AC voltage having a particular frequency, and provide the converted AC voltage to the contactless power transmission device 200. To this end, the charging device 20 may include a voltage conversion unit 22 converting household AC power into an AC voltage of a particular frequency.

When the AC voltage is applied to a thin film coil (not shown) within the contactless power transmission device 200, a magnetic field around the thin film coil is changed. Then, a voltage based on the change in the magnetic field is applied to the contactless power reception apparatus 100 of the electronic device 10 disposed to be adjacent to the contactless power transmission device 200, and accordingly, the battery 12 is charged.

Hereinafter, the contactless power reception apparatus 100 provided in the portable device 10 will be described in detail.

Figure 3:
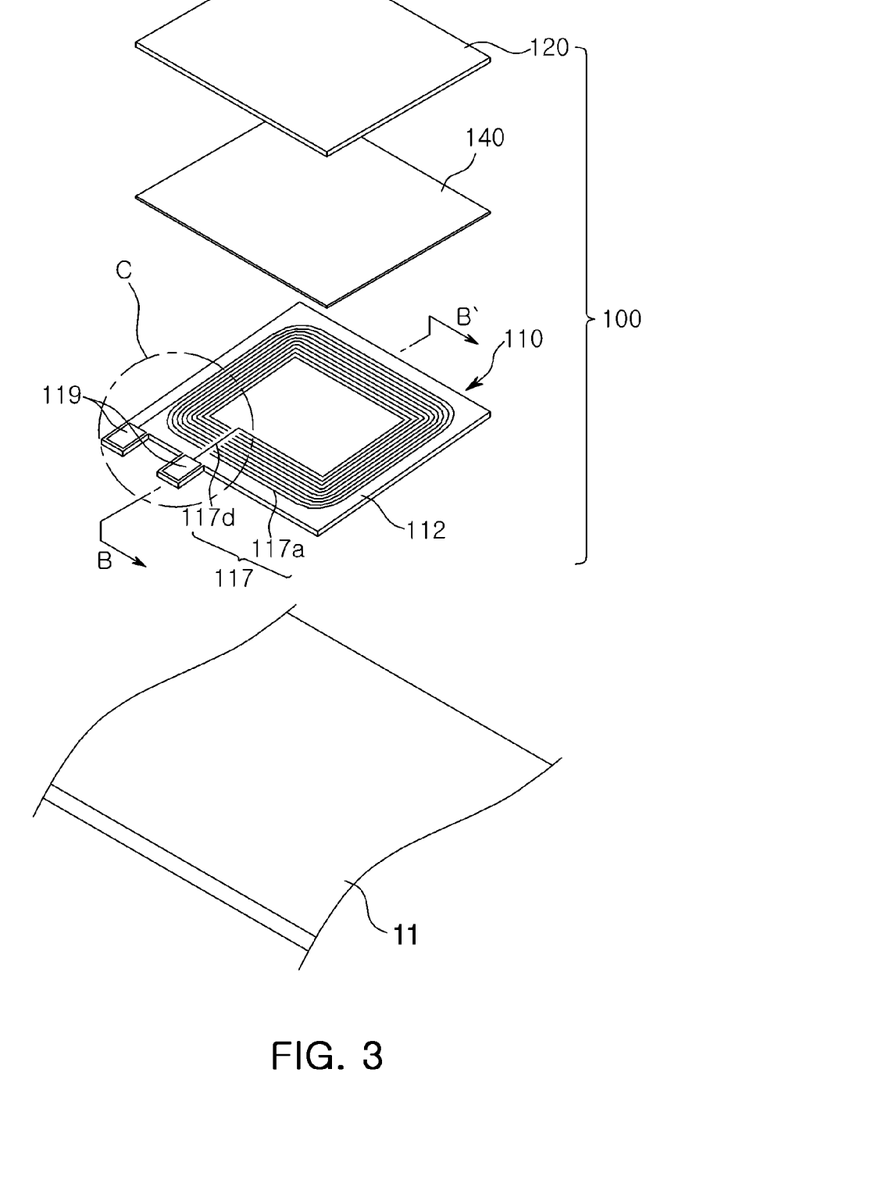
FIG. 3 is an exploded perspective view schematically showing a contactless power reception apparatus of FIG. 2.
Figure 4:
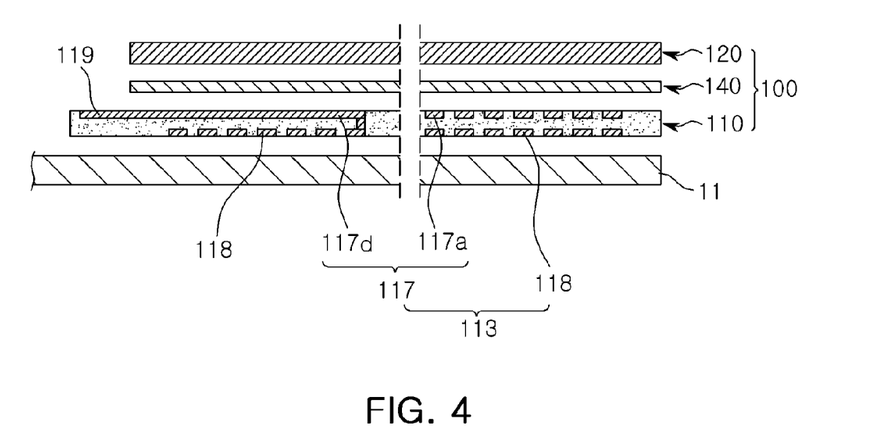
FIG. 4 is an exploded cross-sectional view taken along line B-B' in FIG. 3.
Figure 5:
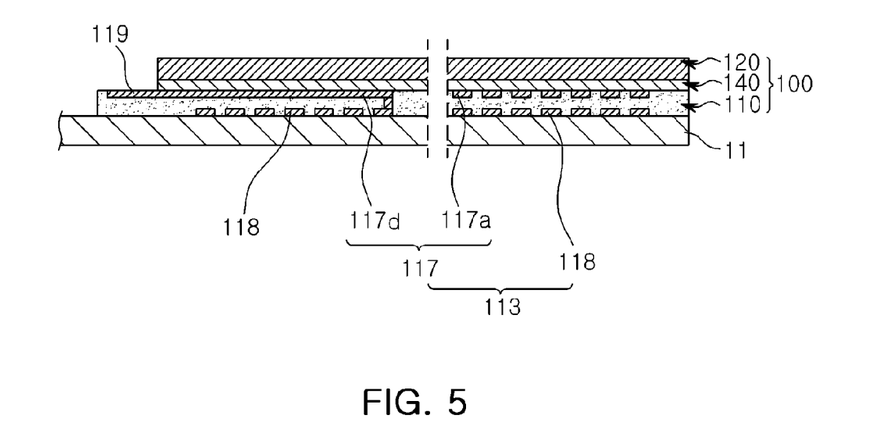
FIG. 5 is an assembled cross-sectional view of the contactless power reception apparatus of FIG. 4.

FIG. 3 is an exploded perspective view schematically showing a contactless power reception apparatus of FIG. 2. FIG. 4 is an exploded cross-sectional view taken along line B-B' in FIG. 3. FIG. 5 is an assembled cross-sectional view of the contactless power reception apparatus of FIG. 4.

With reference to FIGS. 3 through 5, the contactless power reception apparatus 100 may include a magnetic unit 120 and a thin film coil 110.

The magnetic unit 120 has a flat plate-like shape (or a sheet-like shape) and is disposed on one surface of the thin film coil 110 and fixedly attached to the thin film coil 110. The magnetic unit 120 is provided to effectively form a magnetic path of a magnetic field generated by coil patterns 113 of the thin film coil 110. To this end, the magnetic unit 120 may be formed of a material which is able to easily form a magnetic path, and specifically, a ferrite sheet may be used as a material of the magnetic unit 120.

However, the magnetic unit 120 according to the present invention is not limited to the foregoing configuration. Namely, variable applications maybe implemented; for example, ferrite powder or a magnetic solution may be applied to one surface of the thin film coil 110, or the like.

Meanwhile, although not shown, a metal sheet may be further added to an outer surface of the magnetic unit 120 as necessary in order to shield electromagnetic waves or leakage magnetic flux. The metal sheet may be formed of aluminum, or the like, but the present invention is not limited thereto.

Also, in the contactless power reception apparatus 100 according to the present embodiment, a bonding unit 140 may be interposed between the thin film coil 110 and the magnetic unit 120 in order to firmly fix and attach the thin film coil 110 and the magnetic unit 120.

The bonding unit 140 is disposed between the thin film coil 110 and the magnetic unit 120 and bonds the magnetic unit 120 and the thin film coil 110. The bonding unit 140 may be formed by a bonding sheet or a bonding tape, or an adhesive or a resin having adhesiveness may be applied to a surface of a substrate 112 or the magnetic unit 120. In this case, the bonding unit 140 may contain ferrite powder to have magnetism, along with the magnetic unit 120.

The thin film coil 110 may include the substrate 112 and the coil patterns 113 formed on the substrate 112.

The substrate 112 of the thin film coil 110 according to the present embodiment is a thin film substrate, which may be, for example, a flexible printed circuit board (FPCB). However, the present invention is not limited thereto and any substrate, such as a film, a thin PCB, or the like, may be variably used, as long as the substrate is relatively thin and is able to form a wiring pattern.

Figure 6:
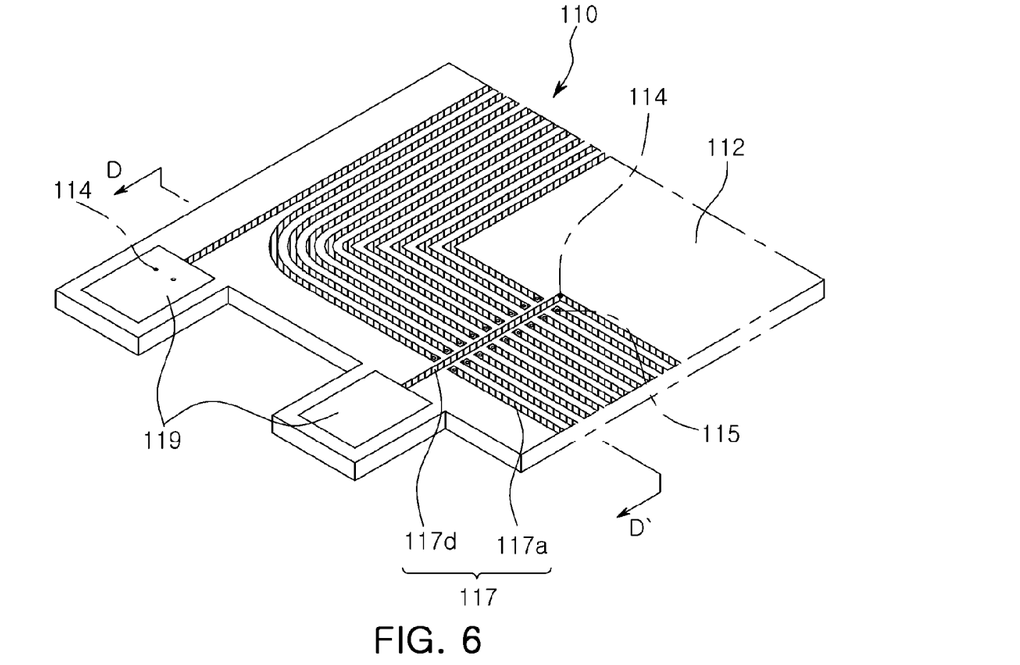
FIG. 6 is an enlarged partial perspective view showing a portion 'C' in FIG. 3.
Figure 7:
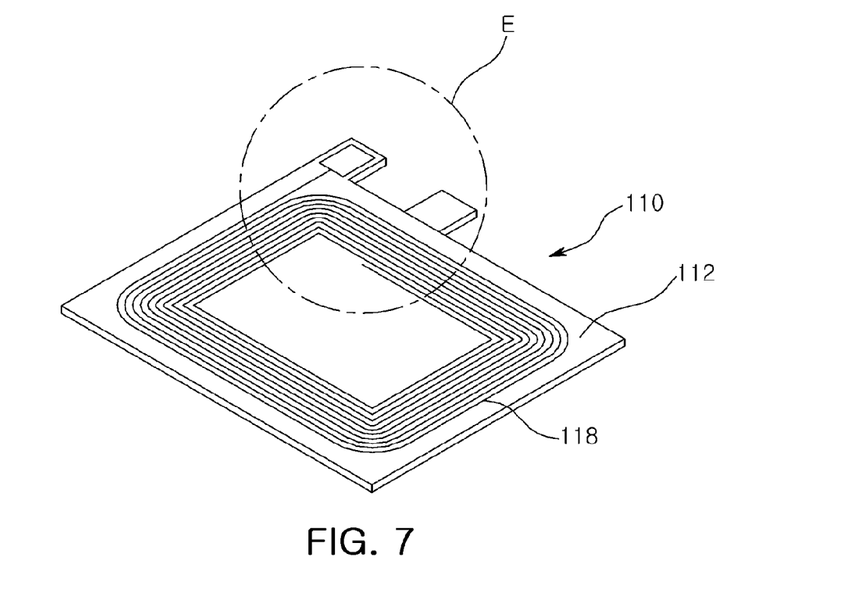
FIG. 7 is a perspective view showing a lower surface of a thin film coil according to an embodiment of the present invention.
Figure 8:
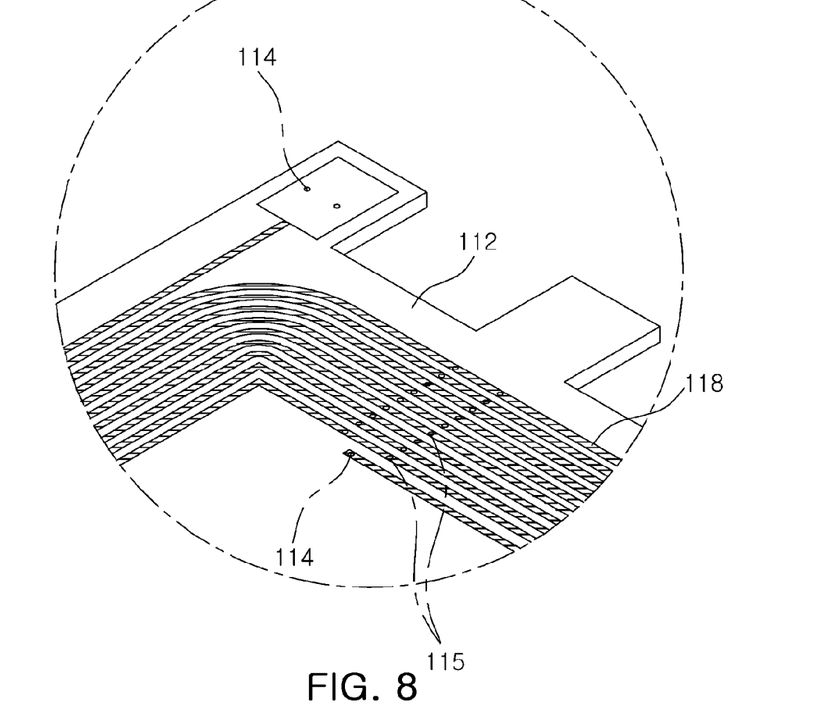
FIG. 8 is an enlarged partial perspective view showing a portion 'E' in FIG. 7.
Figure 9:
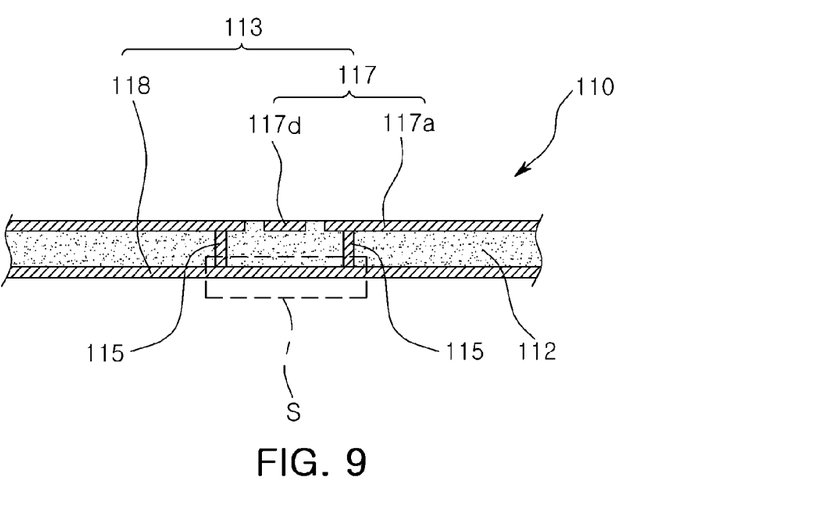
FIG. 9 is a partial cross-sectional view taken along line D-D' in FIG. 6.

FIG. 6 is an enlarged partial perspective view showing a portion 'C' in FIG. 3. FIG. 7 is a perspective view showing a lower surface of a thin film coil according to an embodiment of the present invention. FIG. 8 is an enlarged partial perspective view showing a portion 'E' in FIG. 7. FIG. 9 is a partial cross-sectional view taken along line D-D' in FIG. 6.

With reference to FIGS. 6 through 9, the coil patterns 113 according to the present embodiment are formed as wiring patterns on both surfaces of the substrate 112, and may have a spiral shape on the plane formed by the substrate 112.

The coil patterns 113 may include a plurality of coil strands 117 and 118 disposed to be parallel. Here, the respective coil strands 117 and 118 maybe connected in parallel to form the single coil pattern 113. In the present embodiment, the coil strands 117 and 118 are formed on both surfaces of the substrate 112 to form the single coil pattern 113.

In order to connect the coil strands 117 and 118 in parallel, the thin film coil 110 according to the present embodiment may include a plurality of conductive connection vias 114. The connection vias 114 may electrically connect the coil strands 117 and 118 at both ends of the coil strands 117 and 118.

As illustrated in FIG. 6, in the present embodiment, a case in which the connection vias 114 are formed at inner ends of the spiral pattern 117*a* and contact pads 119 is taken as an example. However, the present invention is not limited thereto and the connection vias 114 may be formed at various positions, have various sizes, and various shapes according to the shape or structure of the coil pattern 113.

Also, according to the present embodiment, any one (e.g., the first coil strand 117) of the coil strands 117 and 118 formed on both surfaces of the substrate 112 may include a spiral pattern 117*a* and a lead out pattern 117*d* disposed to traverse the spiral pattern 117*a* from one end disposed within the spiral pattern 117*a*.

The lead out pattern 117*d* is provided to connect an end of the spiral pattern 117*a* to the outside of the coil pattern 113, namely, to the contact pad 119 as described hereinafter. Thus, the lead out pattern 117*d* is formed as a pattern electrically connecting the end of the spiral pattern 117*a* disposed at the innermost portion and the contact pad 119.

Accordingly, as shown in FIG. 9, the spiral pattern 117*a* of the first coil strand 117 is formed to detour based on the lead out pattern 117*d* at the portion in which the lead out pattern 117*d* is disposed. Namely, the spiral pattern 117*a* of the first coil strand 117 forms at least one detour path going through the other surface of the substrate 112 in the portion in which the lead out pattern 117*d* is disposed, and thus, the spiral pattern 117*a* may maintain the coil shape without being interfered with by the lead out pattern 117*d*.

The detour path (not shown) may be formed not to be in contact with a coil strand (hereinafter, referred to as a 'second coil strand') disposed on the other surfaces of the substrate 112. In this case, the detour path may be disposed in a space between the second coil strands 118.

In this case, however, the entire area of the thin film coil may be increased due to the detour path.

Thus, in the present embodiment, the thin film coil 110 forms the detour path by using the second coil strand 118. Namely, in the present embodiment, the detour path shares portions of the second coil strand 118.

As shown in FIGS. 6 through 9, conductive detour vias 115 are disposed at portions of the spiral pattern 117*a* according to the present embodiment which are discontinued by the lead out pattern 117*d*. The first coil strand 117 is electrically connected to the second coil strand 118 byway of the detour vias 115.

Thus, in the present embodiment, the single detour path may include two detour vias 115 and a portion (i.e., a shared section 'S' in FIG. 9) of the second coil strand 118 disposed between the detour vias 115. The detour paths by the number corresponding to the number of windings of the spiral pattern 117*a* may be formed.

Also, in the present embodiment, the first coil strand 117 and the second coil strand 118 of the coil pattern 113 are disposed on portions at which they are mutually projected by the medium of the substrate 112 (namely, at positions at which the first coil strand 117 and the second coil strand 118 correspond to each other in a vertical direction). Thus, when the detour via 115 is formed to be perpendicular to the substrate 112, the first coil strand 117 and the second coil strand 118 may be easily electrically connected to mutually corresponding patterns by virtue of the detour via 115.

With such a configuration, in the present embodiment, the first and second coil strands 117 and 118 of the coil pattern 113 are independently disposed on both surfaces of the substrate 112 up to a position in which the lead out pattern 117*d* is formed, but at the portion where the lead out pattern 117*d* is formed, the second coil strand 118 on the other surface of the substrate 112 is shared together.

Thus, the coil pattern 113 have a structure in which the respective coil strands 117 and 118 are electrically connected by the number of windings of the coil pattern 113 in the middle of the pattern, rather than having a structure in which the respective coil strands 117 and 118 are electrically connected only at both ends of the pattern.

Meanwhile, in the present embodiment, a case in which the lead out pattern 117*d* is formed at the first coil strand 117 formed on the upper surface of the substrate 112 is taken as an example. However, the present invention is not limited thereto and a lead out pattern maybe formed on a lower surface, rather than on an upper surface, of the substrate 112, namely, on the second coil strand 118.

Also, in the present embodiment, a case in which the respective coil strands 117 and 118 formed on both surfaces of the substrate 112 are formed at positions at which they are mutually projected by the medium of the substrate 112 is taken as an example, but the present invention is not limited thereto. Namely, the respective coil strands 117 and 118 formed on the respective surfaces of the substrate 112 may be formed in mutually deviated positions, rather than in mutually projected positions, or the like. Namely, the coil strands may be variably applied as necessary. In this case, the detour via may be formed in an askew or stepwise manner, rather than to be perpendicular to the substrate, in order to connect the coil strands.

Also, in the present embodiment, the case in which the coil pattern 113 has a quadrangular spiral shape overall is taken as an example, but the present invention is not limited thereto and the coil pattern 113 may be variably applied. Namely, the coil pattern 113 may have a circular or polygonal spiral shape.

In addition, an insulating protective layer (e.g., a resin insulating layer (not shown)) may additionally be formed on an upper portion of the coil pattern 113 in order to protect the coil pattern 113 against the outside as necessary.

Meanwhile, the contact pad 119 may be formed at one side of the substrate 112, i.e., outwardly of the coil pattern 113, in order to electrically connect the coil pattern 113 to the outside.

Both ends of the coil pattern 113 may be supposed to be electrically connected to the contact pad 119, so at least two contact pads 119 may be provided.

Also, in the present embodiment, the contact pads 119 are disposed outwardly of the coil pattern 113. Here, although the contact pads 119 are disposed outwardly of the coil pattern 113, both ends of the coil pattern 113 in the thin film coil 110 according to the present embodiment may be easily connected to the contact pads 119 through the foregoing detour path and the lead out pattern 117d.

Also, as shown in FIG. 6, the contact pad 119 according to the present embodiment may be disposed to be protruded from the substrate 112 having a quadrangular shape. Thus, when the thin film coil 110 and the magnetic unit 120 are coupled, the contact pad 119 is exposed from the magnetic unit 120.

Thus, even after the thin film coil 110 according to the present embodiment is coupled to the magnetic unit 120, the coil pattern 113 and other components (e.g., a battery, a voltage conversion unit, or the like) may be easily electrically connected.

Meanwhile, in the present embodiment, the case in which the coil strand 117 or 118 is formed as a single strand is taken as an example, but the present invention is not limited thereto and the coil strand 117 or 118 maybe formed as multiple strands as in another embodiment as described hereinafter.

Also, in the thin film coil 110 according to the embodiment of the invention, the number of the coil strands 117 and 118 which may be formed on one surface of the substrate 112 may be determined according to the size of the substrate 112, i.e., the size of the electronic device.

Figure 10:
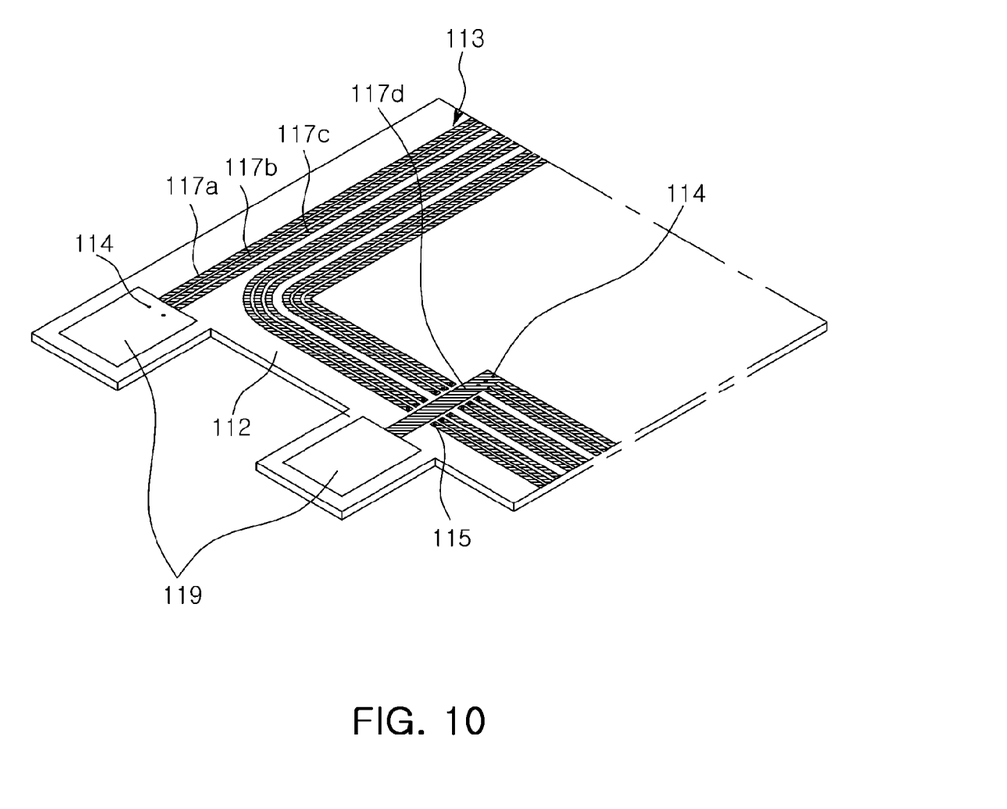
FIG. 10 is a perspective view schematically showing a thin film coil according to another embodiment of the present invention.

Namely, when the substrate 112 is formed to have a relatively large size, a plurality of coil strands, rather than a single strand, may be formed on one surface of the substrate 112 as shown in FIG. 10, and when the substrate 112 is formed to have a relatively small size, only the single coil strand 117 or 118 as in the present embodiment may be formed on one surface of the substrate 112.

Although not shown, the contactless power reception apparatus 100 according to the present embodiment may further include a connection member electrically connecting the contact pad 119 of the thin film coil 110 to the battery 12 (in FIG. 2) of the electronic device in order to provide power generated from the coil pattern 113 of the thin film coil 110 to the battery 12.

The connection member may be a conductive wire or a thin film circuit board (e.g., an FPCB) within a wiring pattern formed therein.

In the contactless power reception apparatus 100 according to the present embodiment, since the coil pattern 113 is formed on the thin film substrate 112, rather than using a wire type coil as in the related art, the thin film coil 110 may be formed to be relatively very thin.

Also, the single coil pattern 113 is formed by the plurality of coil strands 117 and 118 connected in parallel. Thus, the coil pattern 113 according to the present embodiment is formed as a pattern on the substrate 112, but an effect of using a stranded wire type coil (e.g., Litz wire) formed by twisting several strands of wire may be achieved. The use of the stranded type coil may significantly reduce loss (e.g., an AC resistance value, etc.) made by an eddy current, a skin effect, or the like, at a low frequency.

In this manner, in the contactless power reception apparatus 100 according to the present embodiment, although the coil pattern 113 is formed to have a stranded wire form, the thickness of the thin film coil 110 may be significantly reduced (e.g., 0.1 mm or smaller), reducing the overall thickness of the contactless power reception apparatus 100.

In addition, in the contactless power reception apparatus 100 according to the present embodiment, the contact pads 119 of the thin film coil 110 are all disposed on lateral sides of the substrate 112. Also, an additional configuration for disposing the contact pads 119 on the lateral side of the substrate 112 is not required. This strength will be described as follows.

Among the contact pads 119 connected to both ends of the coil pattern 113, the contact pad 119 connected to the coil pattern 113 wound toward the interior (i.e., the center) of the coil pattern 113 may be disposed at the inner side of the coil pattern 113, rather than at an outer side thereof. In this case, the contact pad 119 disposed at the inner side of the coil pattern 113 should be electrically connected to the outside through a conductive wire, a connection board (e.g., an FPCB), or the like.

Also, in order to dispose the contact pads 119 outwardly of the coil pattern 113, a bridge formed of an insulating material maybe formed on the coil pattern 113 to forma pattern or a multilayer substrate formed by laminating several layers should be used as the substrate 112.

In this case, however, a fabrication time or fabrication costs are required to form the bridge on the substrate or fabricate a multilayer substrate, and the overall thickness of the substrate 112 is increased.

However, in the thin film coil 110 according to the present embodiment, the contact pads 119 may be disposed outwardly of the coil pattern 113 without using a multilayer substrate or a bridge. Thus, in comparison to the foregoing case, a fabrication time or fabrication costs may be reduced and the thickness of the thin film coil 110 or the contactless power reception apparatus 100 may be prevented from being increased.

Meanwhile, the configuration of the thin film coil 110 as described above may also be applied in the same manner to the contactless power transmission apparatus 200 provided in the charging device 20. Thus, a detailed description of the contactless power transmission apparatus 200 will be omitted.

Hereinafter, a thin film coil according to an embodiment of the present invention has the same structure as that of the thin film coil (110 in FIG. 6) of the foregoing embodiment, except for a shape of a coil pattern. Thus, the same reference numerals will be used for the same components, a detailed description thereof will be omitted and the shape of the coil pattern will be described in detail.

FIG. 10 is a perspective view schematically showing a thin film coil according to another embodiment of the present invention.

With reference to FIG. 10, the thin film coil 110 according to the present embodiment may include a thin film substrate 112 and the coil pattern 113 formed on the substrate 112, as in the foregoing embodiment.

The coil pattern 113 according to the present embodiment may include a plurality of coil strands 117a to 117c disposed in parallel. The plurality of coil strands 117a to 117c are electrically connected to the same contact pad 119. Accordingly, the respective coil strands 117a to 117c are connected in parallel to form a single coil pattern 113.

In the present embodiment, the case in which the coil pattern 113 is formed by three coil strands 117a to 117c on one surface of the substrate 112 is taken as an example. In this case, the respective coil strands 117a to 117c of the coil pattern 113 are spaced apart from each other at a certain interval and disposed to be parallel to each other.

As in the foregoing embodiment, the coil pattern 113 according to the present embodiment includes the lead out pattern 117d and a plurality of detour vias 115. Thus, there is no need to use a multilayer substrate or a bridge, and the contact pads 119 may be disposed outwardly of the coil pattern 113 without increasing the thickness of the substrate 112, reducing the overall thickness of the thin film coil or the contactless power reception apparatus, shortening a fabrication time, and reducing fabrication costs.

Meanwhile, in FIG. 10, for example, the lead out pattern 117d is formed as a single coil strand, but the present invention is not limited thereto and the lead out pattern 117d may also be formed as a plurality of coil strands like the other portions of the coil pattern 113.

Also, like the coil strands 117a to 117c formed on the upper surface of the substrate 112, a plurality of coil strands (not shown) may be formed on a lower surface of the substrate 112. However, the present invention is not limited thereto, and only a single coil strand having a relatively large width maybe formed on the lower portion of the substrate 112. Namely, the coil strand may have various forms as necessary as long as the coil strands 117a to 117c formed on the upper surface of the substrate 112 may be electrically connected to the coil strand(s) of the lower surface of the substrate 112 through the detour via 115.

As described above, the thin film coil and the electronic device having the same according to embodiments of the present invention are not limited to the foregoing embodiments and are variably applicable. For example, in the foregoing embodiments, the contact pads of the thin film coil are disposed in the same direction of the substrate, but the contact pads may be disposed at both sides of the substrate as necessary. Namely, the contact pads may be variably applicable.

Also, the thin film coil provided in the contactless power transmission apparatus of the electronic device is described as an example in the foregoing embodiments.

However, the present invention is not limited thereto and the thin film coil may be extensively applied to electronic components or electronic devices, such as a transformer, a motor, or the like, which employ a coil.

As set forth above, according to embodiments of the invention, since a coil pattern is formed on a thin film substrate, rather than by using a wire type coil such as that of the related art, the thin film coil may be formed to be relatively very thin.

Also, since the single coil pattern is formed by the plurality of coil strands connected in parallel, an effect of using a stranded wire type coil (e.g., Litz wire) formed by twisting several strands of wire may be achieved. The use of the stranded type coil may significantly reduce a loss (e.g., an AC resistance value, etc.) caused by an eddy current, a skin effect, or the like, at a low frequency.

Also, in the thin film coil according to the present embodiment, the contact pads may be all disposed outwardly of the coil pattern without using a multilayer substrate or a bridge. Thus, a fabrication time or fabrication costs of the thin film coil maybe reduced, and the overall thickness of the thin film coil, an electronic device including the same, or the contactless power reception apparatus may be reduced.

While the present invention has been shown and described in connection with the embodiments, it will be apparent to those skilled in the art that modifications and variations may be made without departing from the spirit and scope of the invention as defined by the appended claims.

What is claimed is:

1. A thin film coil comprising:
   a substrate; and
   a coil pattern including a first coil strand and a second coil strand formed respectively on opposite surfaces of the substrate and electrically connected in parallel with each other, and
   the first coil strand formed on one surface of the substrate including a plurality of paths, each of the plurality of paths passing through the other surface of the substrate and electrically connecting between two sections of the first coil strand located on the one surface.

2. The thin film coil of claim 1, wherein at least one of the plurality of paths comprises a portion of the second coil strand formed on the other surface of the substrate.

3. The thin film coil of claim 2, wherein at least one of the plurality of paths is formed as the first coil strand is connected to the second coil strand through a via.

4. The thin film coil of claim 2, wherein at least one of the plurality of paths comprises:
   two vias electrically connecting the first coil strand and the second coil strand; and
   a conductive section of the second coil strand disposed between the two vias, the conductive section being an electrical path shared between the first coil strand and the second coil strand.

5. The thin film coil of claim 1, further comprising two contact pads disposed outwardly of the coil pattern and electrically connected to both ends of the coil pattern.

6. The thin film coil of claim 5, wherein one end of the first coil strand is electrically connected to the contact pad through a lead out pattern that passes over each of the plurality of paths.

7. The thin film coil of claim 1, wherein the second coil strand includes a conductive connection via formed to be disposed at each of both ends thereof and is electrically connected to the first coil strand by the conductive connection via.

8. The thin film coil of claim 1, wherein the first coil strand and the second coil strand are disposed on portions of both surfaces of the substrate to which they correspond in a vertical direction.

9. The thin film coil of claim 1, wherein the first coil strand comprises:
   a spiral pattern; and
   a lead out pattern formed on the one surface of the substrate and passing from an inner position of the spiral pattern to an outer side of the spiral pattern, the lead out pattern traversing over each of the plurality of paths at portions of the paths passing through the other surface of the substrate, the lead out pattern being substantially coplanar with portions of the first coil strand located on the one surface of the substrate.

10. A case for a portable electronic device, the case adapted to cover a battery of the portable electronic device and comprising:
a contactless power reception apparatus having the thin film coil of claim 1 and attached to an inner surface of the case.

11. A case for a portable electronic device, the case adapted to cover a battery of the portable electronic device, and the case comprising:
a contactless power reception apparatus having the thin film coil of claim 1 and attached to an inner surface of the case, the first coil strand of the thin film coil further comprising
a spiral pattern,
a plurality of paths, each of the plurality of paths passing through the other surface of the substrate and electrically connecting between two sections of the spiral pattern of the first coil strand located on the one surface, each of the plurality of paths comprising
two vias electrically connecting the first coil strand and the second coil strand, and
a conductive section of the second coil strand disposed between the two vias, the conductive section being an electrical path shared between the first coil strand and the second coil strand, and
a lead out pattern formed on the one surface of the substrate and passing from an inner position of the spiral pattern to an outer side of the spiral pattern, the lead out pattern traversing over each of the plurality of paths at portions of the paths passing through the other surface of the substrate, the lead out pattern being substantially coplanar with portions of the first coil strand located on the one surface of the substrate.

12. A portable electronic device comprising:
a contactless power reception apparatus having the thin film coil of claim 1;
a battery configured to receive and store power transmitted to the power reception apparatus, and
a case to contain the power reception apparatus and the battery.

13. A thin film coil comprising:
a substrate;
a coil pattern including a first coil strand and a second coil strand formed respectively on opposite surfaces of the substrate; and
two contact pads disposed outwardly of the coil pattern and electrically connected to both ends thereof,
the first coil strand formed on one surface of the substrate including:
a spiral pattern electrically connected in parallel with the second coil strand,
a lead out pattern disposed to traverse the spiral pattern from one end disposed at an inner side of the spiral pattern so as to be electrically connected to the contact pad, the lead out pattern being substantially coplanar with the spiral pattern, and
a plurality of paths, each of the plurality of paths passing through the other surface of the substrate and electrically connecting between two sections of the first coil strand located on the one surface.

14. The thin film coil of claim 13, wherein a portion of the spiral pattern of the first coil strand in which the lead out pattern is disposed passes through the other surface of the substrate.

15. The thin film coil of claim 14, wherein at least one of the plurality of paths of the first coil shares a portion of the second coil strand formed on the other surface of the substrate.

16. An electronic device comprising:
a contactless power transmission apparatus having a thin film coil including a first coil strand and a second coil strand formed respectively on opposite surfaces of a substrate and electrically connected in parallel with each other,
the first coil strand formed on one surface of the substrate including a plurality of paths, each of the plurality of paths passing through the other surface of the substrate and electrically connecting between two sections of the first coil strand located on the one surface; and
a case to accommodate the contactless power transmission apparatus therein.

17. The electronic device of claim 16, wherein the contactless power transmission apparatus is directly attached to an inner surface of the case or disposed to be closer to the inner surface of the case.

18. The electronic device of claim 16, further comprising:
a battery to store power generated from the contactless power transmission apparatus.

19. The electronic device of claim 16, further comprising
a voltage conversion unit configured to convert alternating current (AC) power supplied from outside the electronic device into an AC voltage having a particular frequency and to provide the converted AC voltage to the contactless power transmission apparatus.

20. A contactless power charging system comprising:
a portable electronic device comprising
a contactless power reception apparatus having a thin film coil, the thin film coil comprising
a substrate; and
a coil pattern including a first coil strand and a second coil strand formed respectively on opposite surfaces of the substrate and electrically connected in parallel with each other, and
the first coil strand formed on one surface of the substrate including at least one path passing through the other surface of the substrate and electrically connecting between two sections of the first coil strand located on the one surface,
a battery configured to receive and store power transmitted to the contactless power reception apparatus, and
a case to contain the contactless power reception apparatus and the battery; and
a charging device comprising a coil, the charging device configured to generate a magnetic field to transmit power to the thin film coil of the contactless power reception apparatus, to thereby charge the battery of the portable electronic device,
the first coil strand comprising
a plurality of paths, each of the plurality of paths passing through the other surface of the substrate and electrically connecting between two sections of the first coil strand located on the one surface,
a spiral pattern, and
a lead out pattern formed on the one surface of the substrate and passing from an inner position of the spiral pattern to an outer side of the spiral pattern, the lead out pattern traversing over each of the plurality of paths at portions of the paths passing through the other surface of the substrate, the lead out pattern being substantially coplanar with portions of the first coil strand located on the one surface of the substrate.

* * * * *